(12) United States Patent
Hong

(10) Patent No.: US 12,096,352 B2
(45) Date of Patent: Sep. 17, 2024

(54) CELL SELECTION METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 361 days.

(21) Appl. No.: 17/596,198

(22) PCT Filed: Jun. 11, 2019

(86) PCT No.: PCT/CN2019/090771
§ 371 (c)(1),
(2) Date: Dec. 3, 2021

(87) PCT Pub. No.: WO2020/248139
PCT Pub. Date: Dec. 17, 2020

(65) Prior Publication Data
US 2022/0248322 A1    Aug. 4, 2022

(51) Int. Cl.
*H04W 48/20* (2009.01)
*H04W 48/16* (2009.01)
*H04W 76/15* (2018.01)
*H04W 88/06* (2009.01)

(52) U.S. Cl.
CPC .......... *H04W 48/20* (2013.01); *H04W 48/16* (2013.01); *H04W 76/15* (2018.02); *H04W 88/06* (2013.01)

(58) Field of Classification Search
CPC ..... H04W 48/16; H04W 48/20; H04W 76/15; H04W 8/183; H04W 88/06; Y02D 30/70

USPC ......................................................... 370/329
See application file for complete search history.

(56) References Cited

U.S. PATENT DOCUMENTS

| | | | |
|---|---|---|---|
| 9,730,149 B2 | 8/2017 | Feng et al. | |
| 9,967,808 B2 | 5/2018 | Chuttani et al. | |
| 10,064,130 B2 | 8/2018 | Tambaram Kailasam et al. | |
| 2015/0126187 A1* | 5/2015 | Ponukumati | H04W 16/14 455/434 |
| 2015/0133130 A1* | 5/2015 | Gupta | H04W 36/00837 455/450 |
| 2015/0264640 A1 | 9/2015 | Feng et al. | |
| 2016/0345244 A1 | 11/2016 | Chuttani et al. | |
| 2017/0289958 A1* | 10/2017 | Dev | H04W 60/00 |

(Continued)

FOREIGN PATENT DOCUMENTS

| CN | 101188835 A | 5/2008 |
|---|---|---|
| CN | 102421088 A | 4/2012 |

(Continued)

OTHER PUBLICATIONS

International Search Report in the international application No. PCT/CN2019/090771, mailed on Mar. 12, 2020.

(Continued)

*Primary Examiner* — Robert J Lopata
(74) *Attorney, Agent, or Firm* — Syncoda LLC; Feng Ma

(57) ABSTRACT

A cell selection method includes: when a terminal contains at least two subscriber identification modules, using one of the at least two subscriber identification modules to select a cell in which each of the at least two subscriber identification modules resides.

16 Claims, 9 Drawing Sheets

(56) References Cited

U.S. PATENT DOCUMENTS

| | | | | |
|---|---|---|---|---|
| 2017/0318523 | A1* | 11/2017 | Lindoff | H04W 48/20 |
| 2018/0027407 | A1 | 1/2018 | Veneroso | |
| 2018/0041953 | A1* | 2/2018 | Lindoff | H04W 24/08 |
| 2018/0070303 | A1 | 3/2018 | Tambaram Kailasam et al. | |
| 2018/0152937 | A1* | 5/2018 | Wen | H04W 12/082 |
| 2020/0396591 | A1* | 12/2020 | Ou | H04W 24/08 |
| 2021/0022209 | A1* | 1/2021 | Singh | H04L 43/16 |
| 2021/0282103 | A1* | 9/2021 | Zhu | H04W 76/15 |
| 2021/0345097 | A1* | 11/2021 | Wu | H04W 76/15 |

FOREIGN PATENT DOCUMENTS

| | | |
|---|---|---|
| CN | 103313227 A | 9/2013 |
| CN | 103379584 A | 10/2013 |
| CN | 103379622 A | 10/2013 |
| CN | 103906154 A | 7/2014 |
| CN | 104796963 A | 7/2015 |
| CN | 104918300 A | 9/2015 |
| CN | 104980905 A | 10/2015 |
| CN | 105517076 A | 4/2016 |
| CN | 105792325 A | 7/2016 |
| CN | 106170147 A | 11/2016 |
| CN | 106604332 A | 4/2017 |
| WO | 2012109830 A1 | 8/2012 |

OTHER PUBLICATIONS

First Office Action of the Chinese application No. 201980001070.X, issued on Apr. 6, 2021.

Notice of Allowance of the Chinese application No. 201980001070.X, issued on Jan. 19, 2022.

English translation of the Written Opinion of the International Search Authority in the international application No. PCT/CN2019/090771, mailed on Mar. 12, 2020.

* cited by examiner

In response to that a terminal includes at least two SIMs, a cell for each of the at least two SIMs to reside in is selected by one of the at least two SIMs — S201

FIG. 2

CELL SELECTION METHOD AND APPARATUS, COMMUNICATION DEVICE, AND STORAGE MEDIUM

CROSS-REFERENCE TO RELATED APPLICATION

This application is a U.S. national stage of International Application No. PCT/CN2019/090771, the disclosure of which is hereby incorporated by reference in its entirety.

TECHNICAL FIELD

The disclosure relates, but is not limited, to the technical field of wireless communication, and particularly to a method and apparatus for cell selection, a communication device, and a storage medium.

BACKGROUND

With development of wireless communication technologies, multi-SIM terminal devices with two or even more Subscriber Identification Module (SIM) cards have gradually become more and more popular due to the convenience thereof.

At present, processing manners for multi-SIM mobile phones are mainly implemented based on each terminal manufacturer without a unified standard, resulting in many different terminal behaviors and processing manners. A multi-SIM terminal consumes more power than the ordinary terminal, thus shortening standby time of the terminal.

SUMMARY

The disclosure provides a method and apparatus for cell selection, a communication device, and a storage medium.

According to a first aspect of the disclosure, a method for cell selection is provided, including: in response to that a terminal includes at least two subscriber identification modules (SIMs), selecting, by one of the at least two SIMs, a cell for each of the at least two SIMs to reside in.

According to a second aspect of the disclosure, an apparatus for cell selection is provided, including a selection module, configured to: in response to that a terminal includes at least two subscriber identification modules (SIMs), select, by one of the at least two SIMs, a cell for each of the at least two SIMs to reside in.

According to a third aspect of the present application, a mobile terminal is provided, which may include: an antenna; a memory, configured to store an executable program; and a processor, connected with the antenna and the memory respectively and configured to control transceiving of the antenna and run the executable program to execute actions of the method for cell selection.

According to a fourth aspect of the disclosure, provided is a storage medium having stored thereon an executable program that, when executed by a processor, implements actions of the method for cell selection as described above.

According to the technical solutions provided in embodiments of the disclosure, if a terminal includes two or more than two SIMs, during cell selection, not every SIM needs to perform cell selection. Instead, a cell to reside in may be selected using one of the SIMs. Therefore, the power consumption generated by repeated cell selection is reduced, the overall power consumption of the terminal is reduced, and the standby time of the terminal is prolonged.

BRIEF DESCRIPTION OF THE DRAWINGS

FIG. 2 illustrates a flow chart of a method for cell selection according to embodiments of the disclosure.

DETAILED DESCRIPTION

A network architecture and service scene described in the embodiments of the disclosure serve to describe the technical solutions of the embodiments of the disclosure more clearly and not intended to form limitation thereto. Those of ordinary skill in the art should know that, with evolution of the network architecture and emergence of new service scenes, the technical solutions provided in the embodiments of the disclosure are also applicable to similar technical problems.

Figure 1:
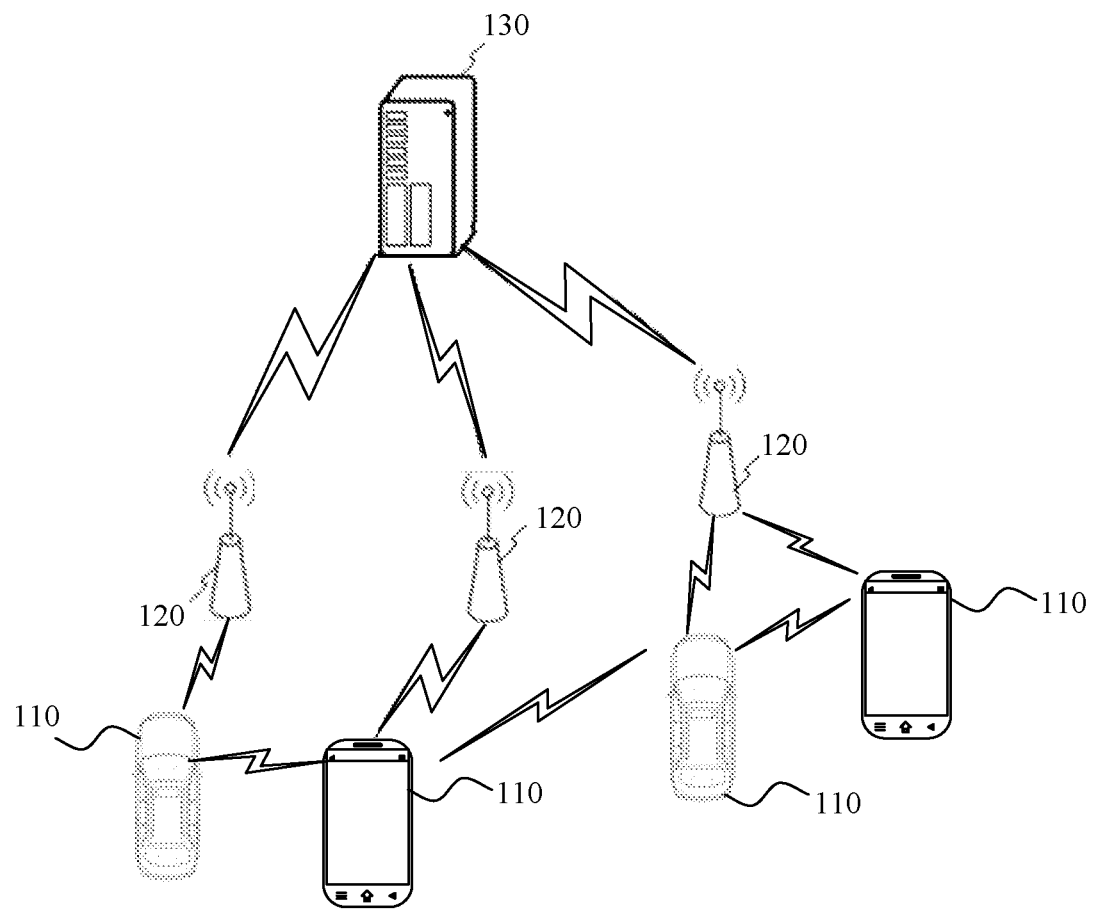
FIG. 1 illustrates a schematic structural diagram of a wireless communication system according to embodiments of the disclosure.

FIG. 1 illustrates a schematic structural diagram of a wireless communication system provided in embodiments of the disclosure. As illustrated in FIG. 1, the wireless communication system is a cellular mobile communication technology-based communication system. The wireless communication system may include multiple terminals 110 and multiple base stations 120.

The terminal 110 may refer to a device providing voice and/or data connectivity for a user. The terminal 110 may communicate with one or more core networks through a Radio Access Network (RAN). The terminal 110 may be an Internet of things terminal, e.g., a sensor device, a mobile phone (or referred to as a "cell" phone) and a computer with an Internet of things terminal, and for example, may be a fixed, portable, pocket-sized, handheld, computer-embedded or vehicle-mounted device, e.g., a station (STA), a subscriber unit, a subscriber station, a mobile station, a mobile, a remote station, an access point, a remote terminal, an access terminal, a user terminal, a user agent, user equipment (UE) or a user terminal. Alternatively, the terminal 110 may be a device of an unmanned aerial vehicle. Alternatively, the terminal 110 may be a vehicle-mounted device, e.g., a trip computer with a wireless communication function or a wireless communication device connected with an external trip computer. Alternatively, the terminal 110 may be a roadside device, e.g., a street lamp, signal lamp or another roadside device with a wireless communication function.

The base station 120 may be a network-side device in the wireless communication system. The wireless communication system may be a 4th Generation mobile communication (4G) system, also referred to as a Long Term Evolution (LTE) system. Alternatively, the wireless communication system may be a 5th-Generation (5G) system, also referred to as a New Radio (NR) or a 5G NR system. Alternatively, the wireless communication system may be a next-generation system of the 5G system. An access network in the 5G system may be referred to as a New Generation-Radio Access Network (NG-RAN), The base station 120 may be an Evolved Node B (eNB) in the 4G system. Alternatively, the base station 120 may be a gNB with a central distributed architecture in the 5G system. The base station 120 with a central distributed architecture usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are provided in the CU. A Physical (PHY) layer protocol stack is provided in the DU. Specific implementation of the base station 120 is not limited in the embodiment of the present application.

The base station 120 may establish a wireless connection with the terminal 110 through a radio air interface. In different implementations, the radio air interface is a 4G specification based radio air interface. Alternatively, the radio interface is a 5G specification based radio air interface. For example, the radio air interface is a new radio (NR) air interface. Alternatively, the radio air interface may be a radio air interface based on a next-generation mobile communication network technology specification of 5G.

In some embodiments, the terminals 110 may also establish End-to-End (E2E) connections with one another, e.g., scenes of Vehicle to Vehicle (V2C) communication, Vehicle to Infrastructure (V2I) communication, Vehicle to Pedestrian (V2P) communication and the like in Vehicle to Everything (V2X).

In some embodiments, the wireless communication system may further include a network management device 130.

Several base stations 120 are connected with the network management device 130 respectively. The network management device 130 may be a core network device in the wireless communication system. For example, the network management device 130 may be a Mobility Management Entity (MME) in an Evolved Packet Core (EPC). Alternatively, the network management device may be another core network device, e.g., a Serving GateWay (SGW), a Public Data Network GateWay (PGW), a Policy and Charging Rules Function (PCRF) or a Home Subscriber Server (HSS). An implementation form of the network management device 130 is not limited in the embodiment of the disclosure.

As illustrated in FIG. 2, a method for cell selection is provided in some embodiments. The method includes the following action S201.

In S201, in response to that a terminal includes at least two SIMs, a cell is selected by one of the at least two SIMs, for each of the at least two SIMs to reside in.

In the embodiments, the method for cell selection is applied to a terminal. The terminal includes, but is not limited to, a mobile phone, a pad, a wearable device, or an Internet of things device.

In the embodiments, if a terminal includes at least two SIMs, it indicates that the mobile terminal includes two SIMs or more than two SIMs. In brief, the terminal may include N SIMs, and N may be 2 or a positive integer greater than 2.

The terminal includes multiple SIMs. A behavior mode of the terminal with the multiple SIMs may be dual-card dual-standby single-pass, dual-card dual-standby dual-pass, triple-card triple-standby, etc.

The SIM may be a SIM card existing in form of an individual, an embedded SIM (e-SIM) existing in the terminal in an integrated form, or the like.

In the embodiments, if the terminal includes two or more SIMs, not every SIM needs to select a cell for itself to reside in. Instead, only one of the at least two SIMs is used to select a cell to reside in. Thus, the power consumption of the terminal in selecting a cell to reside in is reduced, and the standby time of the terminal is prolonged.

Since the at least two SIMs are located in the same terminal, present positions of these SIMs are the same. Even if these SIMs select cells to reside in separately, there is a high probability that the same cell is selected to reside in.

Therefore, in the embodiments, the cell to reside in may be selected using only one SIM. On one hand, it may be ensured that a suitable cell to reside in may still be selected for each SIM. On the other hand, operations of residing in a cell are simplified, thereby reducing the power consumption of the terminal produced by selecting cells to reside in by multiple SIMs separately and prolonging the standby time of the terminal.

In some embodiments, S201 may include that: the cell for each of the at least two SIMs to reside in is selected according to cell information stored in the one of the at least two SIMs.

During cell selection, one or more of the at least two SIMs may be stored with cell information of cells where they have resided in historically.

The cell information may include information of various cell parameters.

The cell parameters include at least one of following:
a cell list: multiple cells may be formed by a base station, and the cell list includes serial numbers of the multiple cells formed by the base station, etc.;
a carrier frequency configuration table, including frequency information of cell frequency points;
a cell attribute table;
a cell alert threshold table;
a cell call processing parameter control table;
a cell call processing table, or the like.

On one hand, the cell information may make it convenient for the terminal to perform cell access based on corresponding SIMs. On the other hand, various operations are performed according to the cell information in an access or connection process, and cell measurement reporting and the like are performed based on thresholds in the cell alert threshold table.

Therefore, if there is cell information stored in any one of the at least two SIMs, when a cell to reside in is selected again, the cell for each SIM to reside in may be selected according to the stored cell information preferentially.

For example, the terminal includes SIM1, USIM2 and eSIM3. It is found in action 201 that there is cell information stored in SIM1, and cell A is selected for residence according to the cell information. Thus, cell A is the cell for SIM1, USIM2 and eSIM3 to reside in.

In summary, in the embodiments, a cell suitable for the one SIM to reside in may be directly determined as the cell for the other SIMs to reside in. In this way, the cells for multiple SIMs to reside in are selected by one time of residing cell selection.

Figure 3:
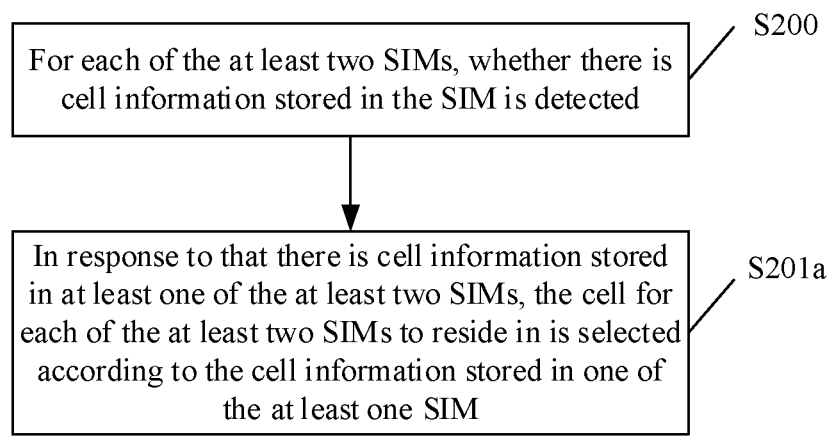
FIG. 3 illustrates a flow chart of a method for cell selection according to embodiments of the disclosure.

In some embodiments, as illustrated in FIG. 3, the method further includes the following action S200.

In S200, for each of the at least two SIMs, whether there is cell information stored in the SIM is detected.

S201 may include S201a. S201a may include that: in response to that there is cell information stored in at least one SIM of the at least two SIMs, the cell for each of the at least two SIMs to reside in is selected according to the cell information stored in one of the at least one SIM.

In the embodiments, a processor of the terminal may read a storage region for storing cell information in any one of the at least two SIMs, to determine whether there is cell information stored in at least one SIM. If there is cell information stored in at least one SIM, the cell to reside in is selected using one SIM according to the stored cell information in action 201.

For example, S201 may include at least one of the following operations.

If there is cell information stored in M of N SIMs, the cell information in the SIM in which the stored cell information is used frequently is selected, so as to select the cell to reside in. M is a positive integer less than N or equal to N. If there is cell information stored in M of the N SIMs, the SIM storing cell information of a final residing cell is selected from the M SIMs, so as to select the cell to reside in. If there is cell information stored in one of the N SIMs, the cell information in the SIM that stores the cell information is selected, so as to select the cell to reside in.

Figure 4:
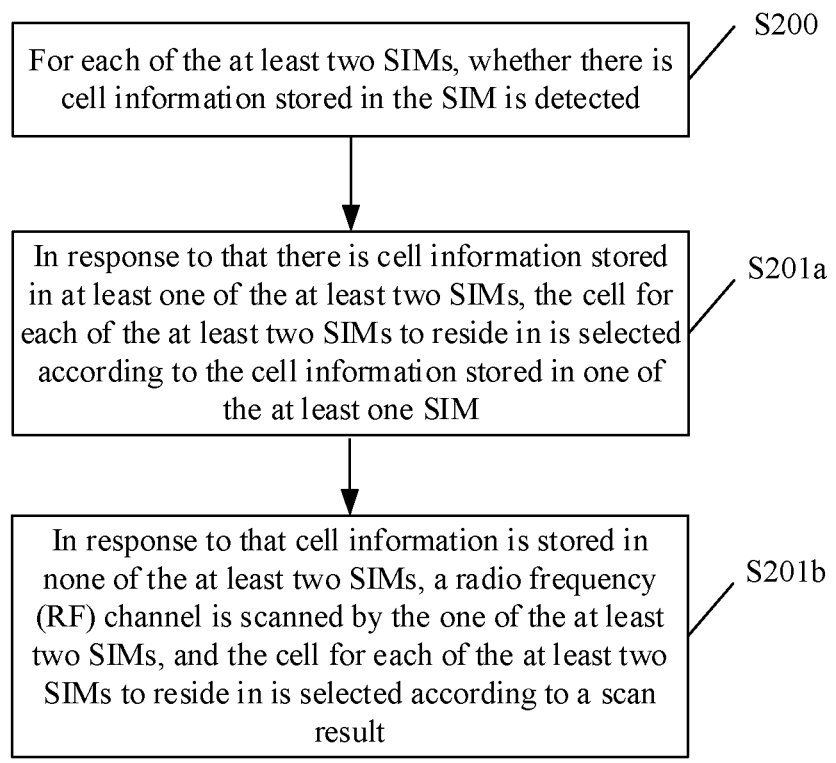
FIG. 4 illustrates a flow chart of a method for cell selection according to embodiments of the disclosure.

In some embodiments, as illustrated in FIG. 4, S201 may include S201b. S201b may include that: in response to that no cell information is stored in any one of the at least two SIMs, a Radio Frequency (RF) channel is scanned by the one of the at least two SIMs, and the cell for each of the at least two SIMs to reside in is selected according to a scan result.

If no cell information is stored in any one of the N SIMs, the cell to reside in is selected using one of the N SIMs.

Figure 5:
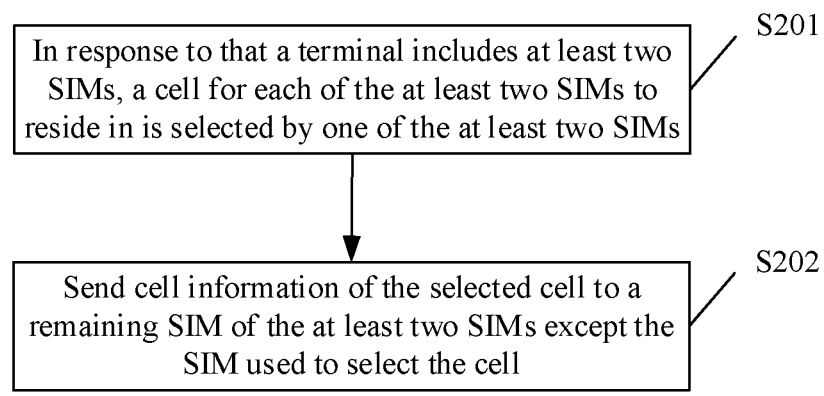
FIG. 5 illustrates a flow chart of a method for cell selection according to embodiments of the disclosure.

In some embodiments, as illustrated in FIG. 5, the method further includes the following action S202.

In S202, cell information of the selected cell is sent to a remaining SIM of the at least two SIMs except the SIM used to select the cell.

In S202, the cell information of the selected cell to reside in is sent to the other SIMs except the SIM used to select the cell. On one hand, according to the received cell information, the other SIMs may conveniently determine that the cell to reside in has been selected. On the other hand, when residing in a cell, the other SIMs may conveniently reside in a cell according to the cell information.

Figure 6:
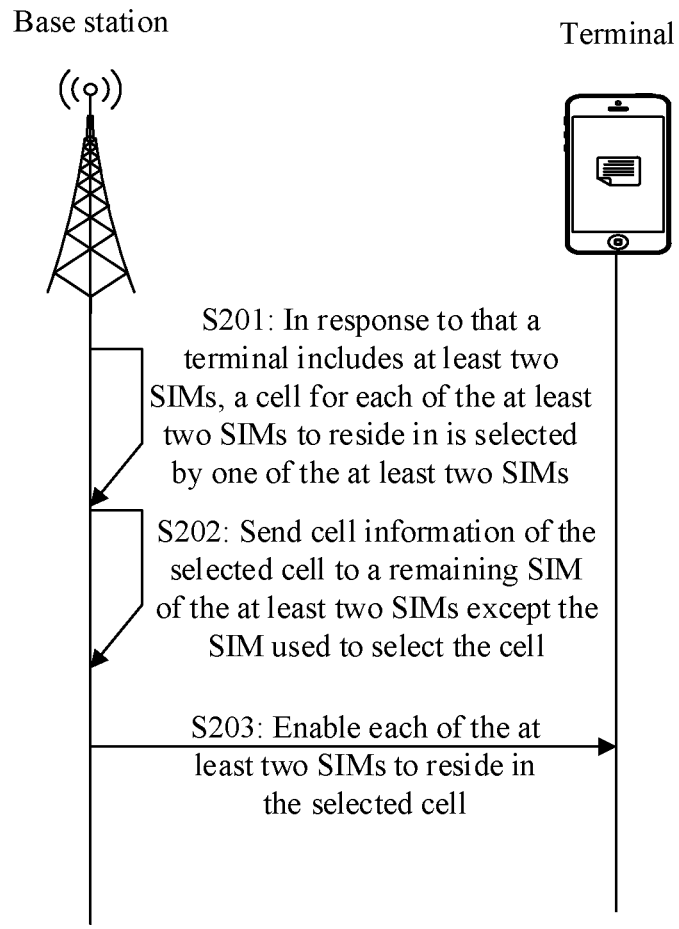
FIG. 6 illustrates a flow chart of a method for cell selection according to an embodiment of the present application.

In some embodiments, as illustrated in FIG. 6, the method further includes the following action S203.

In S203, each of the at least two SIMs is enabled to reside in the selected cell.

In some embodiments, the at least two SIMs are connected to a same operator network. If the at least two SIMs belong to different operators, different cells to reside in are selected.

In some embodiments, networks of different operators are integrated, and SIMs belonging to the different operators may also select the same cell to reside in.

Figure 7:
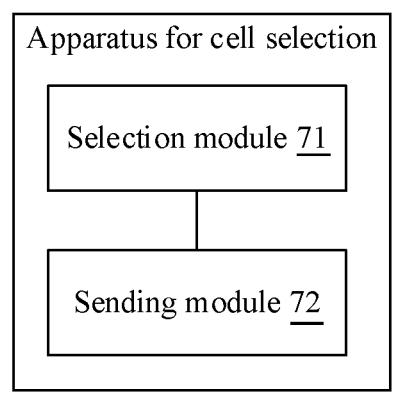
FIG. 7 illustrates a schematic structural diagram of an apparatus for cell selection according to embodiments of the disclosure.

As illustrated in FIG. 7, the embodiments provide an apparatus for cell selection. The apparatus includes a selection module 71.

The selection module 71 is configured to: in response to that a terminal includes at least two subscriber identification modules (SIMs), select, by one of the at least two SIMs, a cell for each of the at least two SIMs to reside in.

In some embodiments, the selection module 71 may be a program module. After the program module is executed by a processor, the cell to reside in may be selected by one SIM.

In some embodiments, the selection module 71 may be a software and hardware combination module. The software and hardware combination module includes, but not limited to, various programmable arrays. The programmable arrays include a field programmable array or a complex programmable array.

In some other embodiments, the selection module 71 may include a pure hardware module, e.g., an Application Specific Integrated Circuit (ASIC).

In some embodiments, the selection module 71 is configured to: select, according to cell information stored in the one of the at least two SIMs, the cell for each of the at least two SIMs to reside in.

In some embodiments, the selection module 71 is configured to: for each of the at least two SIMs, detect whether there is cell information stored in the SIM; and in response to that there is cell information stored in at least one SIM of the at least two SIMs, select the cell for each of the at least two SIMs to reside in according to the cell information stored in one of the at least one SIM.

In some embodiments, the selection module 71 is configured to: in response to that no cell information is stored in any one of the at least two SIMs, scan a radio frequency (RF) channel, and select, according to a scan result, the cell for each of the at least two SIMs to reside in.

In some embodiments, the apparatus further includes: a sending module 72, configured to send cell information of the selected cell to a remaining SIM of the at least two SIMs except the SIM used to select the cell.

In some embodiments, the apparatus further includes: a residence module, configured to enable each of the at least two SIMs to reside in the selected cell.

In some embodiments, the at least two SIMs are connected to a same operator network.

A particular example will be provided below in combination with any above embodiment.

Situation 1: for a scenario that multiple SIM cards of a multi-SIM terminal belong to the same operator, after the multi-SIM terminal is started, in addition to detecting whether there is information such as frequency information and cell parameter information stored by itself before, each SIM card further needs to detect whether there is information such as frequency information and cell parameter information stored by the other SIM cards before.

If YES, cell selection is performed according to cell information to determine a cell to reside in. If NOT, situation 2 is executed.

Situation 2: one SIM card performs cell selection, and the other SIMs do not perform cell selection. The SIM card performing cell selection notifies selected cell information to the other SIM cards when completing cell selection. The other SIM cards determine the cell as their new cell to reside in.

For the case that multiple SIM cards of multi-SIM UE are connected the same operator network, only one SIM card needs to perform RF scanning at the same time and perform cell selection based on a scan result. Therefore, the power of the terminal is saved on.

If any SIM card is stored with cell information, all the other SIM cards do not need to scan and measure all RF channels on an NR band to find suitable cells. Therefore, the power of the terminal is saved on.

The embodiments further provide a communication device. The communication device includes: an antenna, a memory, and a processor, connected with the antenna and the memory respectively and configured to execute an executable program stored in the memory to control wireless signal transceiving of the antenna and execute actions of the method for cell selection provided in any above embodiment.

The communication device provided in the embodiments may be the above-mentioned terminal or base station. The terminal may be various types of carry-on terminals or vehicle-mounted terminals. The base station may be various types of base stations, e.g., a 4G base station or a 5G base station.

The antenna may be various types of antennae, such as a mobile antenna like a 3rd-Generation (3G) antenna, a 4G antenna, or a 5G antenna. The antenna may also include a Wireless Fidelity (Wi-Fi) antenna, a wireless charging antenna, or the like.

The memory may include various types of storage media. The storage medium is a non-transitory computer storage medium and may keep information in the communication device after a power failure of the communication device.

The processor may be connected with the antenna and the memory through a bus or the like, and is configured to read the executable program stored in the memory to implement, for example, the method for cell selection illustrated in FIGS. 2 to 6.

Embodiments of the disclosure further provide a non-transitory computer-readable storage medium having stored there on an executable program that, when executed by a processor, implement the actions of the method for cell selection provided in any above-mentioned embodiment, for example, at least one of the methods illustrated in FIGS. 2 to 6.

Figure 8:
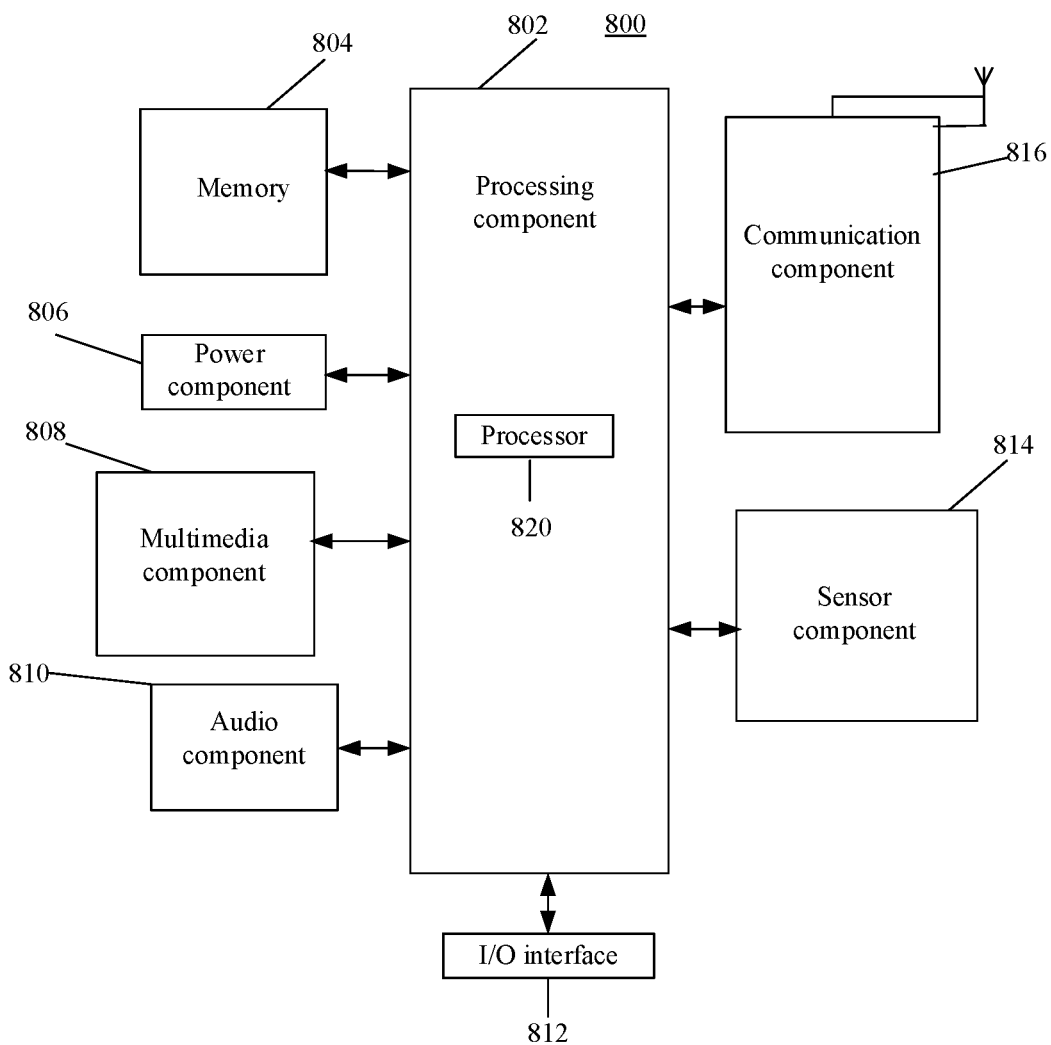
FIG. 8 illustrates a schematic structural diagram of a terminal according to embodiments of the disclosure.

A terminal 800 is illustrated in FIG. 8. The terminal may specifically be a mobile phone, a computer, a digital broadcast terminal, a messaging device, a gaming console, a tablet, medical equipment, exercise equipment, a personal digital assistant or the like.

Referring to FIG. 8, the terminal 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operation of the terminal 800, such as the operations associated with display, telephone calls, data communications, camera operations, and recording operations. The processing component 802 may include one or more processors 820 to execute instructions to perform all or some of the actions in the above-mentioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the terminal 800. Examples of such data include instructions for any application programs or methods operating on the terminal 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the terminal 800. The power component 806 may include a power management system, one or more power supplies, and other components associated with generation, management and distribution of power for the terminal 800.

The multimedia component 808 includes a screen providing an output interface between the terminal 800 and a user. In some embodiments, the screen may include a Liquid Crystal Display (LCD) and a Touch Panel (TP). If the screen includes a TP, the screen may be implemented as a touch screen to receive input signals from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the terminal 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC). The MIC is configured to receive an external audio signal when the terminal 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module. The peripheral interface module may be a keyboard, a click wheel, a button, etc. The button may include, but not limited to: a home button, a volume button, a start button, and a lock button.

The sensor component 814 includes one or more sensors configured to provide status assessment in various aspects for the terminal 800. For instance, the sensor component 814 may detect an on/off status of the terminal 800 and relative positioning of components, such as a display and small keyboard of the terminal 800. The sensor component 814 may further detect a change in a position of the terminal 800 or a component of the terminal 800, presence or absence of contact between the user and the terminal 800, orientation or acceleration/deceleration of the terminal 800 and a change in temperature of the terminal 800. The sensor component 814 may include a proximity sensor configured to detect the presence of an object nearby without any physical contact. The sensor component 814 may also include a light sensor, such as a Complementary Metal Oxide Semiconductor (CMOS) or Charge Coupled Device (CCD) image sensor, for use in an imaging application. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal 800 and another device. The terminal 800 may access a communication specification based wireless network, such as a WiFi network, a 2nd-Generation (2G) or 3G network, or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Bluetooth (BT) technology, and another technology.

In an exemplary embodiment, the terminal 800 may be implemented by one or more ASICs, Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an exemplary embodiment, there is also provided a non-transitory computer-readable storage medium including instructions, such as the memory 804 including instructions. The instructions may be executed by the processor 820 of the terminal 800 to implement the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device, etc.

The terminal may be configured to implement the above-mentioned method for cell selection, e.g., the method for cell selection illustrated in FIGS. 2 to 6.

Figure 9:
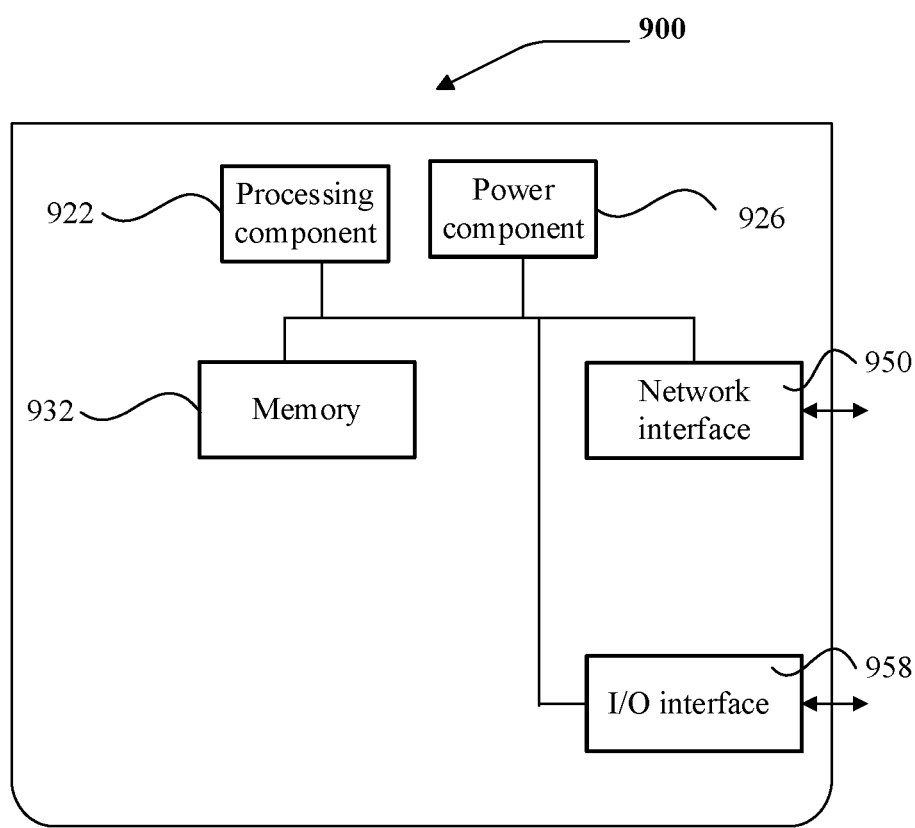
FIG. 9 illustrates a schematic structural diagram of a base station according to embodiments of the disclosure.

FIG. 9 illustrates a block diagram of a base station 900 according to an exemplary embodiment. For example, the base station 900 may be provided as a network-side device. Referring to FIG. 9, a base station 900 includes a processing component 922 which further includes one or more processors, and a memory resource represented by a memory 932, configured to store instructions executable for the processing component 922, e.g., an application program. The application program stored in the memory 932 may include one or more modules of which each corresponds to a set of instructions. In addition, the processing component 922 is configured to execute the instructions to execute the method for cell selection provided in any above-mentioned method embodiment, e.g., the method illustrated in FIGS. 2 to 6.

The base station 900 may further include a power component 926 configured to execute power management of the base station 900, a wired or wireless network interface 950 configured to connect the base station 900 to a network, and an I/O interface 958. The base station 900 may be operated based on an operating system stored in the memory 932, e.g., Windows Server™, Mac OS X™, Unix™, Linux™, FreeBSD™, or the like.

The wireless network interface 950 includes, but not limited to, the antenna of the above-mentioned communication device. Other implementations of the application will be apparent to those skilled in the art from consideration of the specification and practice of the present disclosure. This application is intended to cover any variations, uses, or adaptations of the present application following the general principles thereof and including such departures from the present application as come within known or customary practice in the art. It is intended that the specification and examples be considered as exemplary only, with a true scope and spirit of the present application being indicated by the following claims.

According to the technical solutions provided in embodiments of the disclosure, if a terminal includes two or more than two SIMs, during cell selection, not every SIM needs to perform cell selection. Instead, a cell to reside in may be selected using one of the SIMs. Therefore, the power consumption generated by repeated cell selection is reduced, the overall power consumption of the terminal is reduced, and the standby time of the terminal is prolonged.

It will be appreciated that the present application is not limited to the exact construction that has been described above and illustrated in the accompanying drawings, and that various modifications and changes may be made without departing from the scope thereof. It is intended that the scope of the present application only be limited by the appended claims.

What is claimed is:

1. A method for cell selection, comprising:
    in response to that a terminal comprises at least two subscriber identification modules (SIMs), for each of the at least two SIMs detecting whether there is cell information stored in the SIM; and
    in response to that there is cell information stored in at least one SIM of the at least two SIMs, selecting a cell for each of the at least two SIMs to reside in according to the cell information stored in one of the at least one SIM.

2. The method of claim 1, further comprising:
    in response to that no cell information is stored in any one of the at least two SIMs, scanning, by the one of the at least two SIMs, a radio frequency (RF) channel, and selecting, according to a scan result, the cell for each of the at least two SIMs to reside in.

3. The method of claim 1, further comprising:
    sending cell information of the selected cell to a remaining SIM of the at least two SIMs except the SIM used to select the cell.

4. The method of claim 1, further comprising:
    enabling each of the at least two SIMs to reside in the selected cell.

5. The method of claim 1, wherein the at least two SIMs are connected to a same operator network.

6. A mobile terminal, comprising:
    an antenna;
    a memory, configured to store an executable program; and
    a processor, coupled with the antenna and the memory, and configured to control transceiving of the antenna and run the executable program to:
    in response to that the mobile terminal comprises at least two subscriber identification modules (SIMs), for each of the at least two SIMs, detect whether there is cell information stored in the SIM; and
    in response to that there is cell information stored in at least one SIM of the at least two SIMs, select a cell for each of the at least two SIMs to reside in according to the cell information stored in one of the at least one SIM.

7. The mobile terminal of claim 6, wherein the processor is further configured to:
    in response to that no cell information is any one of the at least two SIMs, scan a radio frequency (RF) channel, and select, according to a scan result, the cell for each of the at least two SIMs to reside in.

8. The mobile terminal of claim 6, wherein the processor is further configured to:
    send cell information of the selected cell to a remaining SIM of the at least two SIMs except the SIM used to select the cell.

9. The mobile terminal of claim 6, wherein the processor is further configured to:
    enable each of the at least two SIMs to reside in the selected cell.

10. The mobile terminal of claim 6, wherein the at least two SIMs are connected to a same operator network.

11. A non-transitory computer-readable storage medium having stored thereon an executable program that, when executed by a processor, implements a method for cell selection, the method comprising:
    in response to that a terminal comprises at least two subscriber identification modules (SIMs) and no cell information is stored in any one of the at least two SIMs, scanning, by one of the at least two SIMs, a radio frequency (RF) channel, and selecting, according to a scan result, a cell for each of the at least two SIMs to reside in.

12. The non-transitory computer-readable storage medium of claim 11, wherein the selecting, by one of the at least two SIMs, a cell for each of the at least two SIMs to reside in comprises:
    selecting, according to cell information stored in the one of the at least two SIMs, the cell for each of the at least two SIMs to reside in.

13. The non-transitory computer-readable storage medium of claim 12, wherein the method further comprises:
    for each of the at least two SIMs, detecting whether there is cell information stored in the SIM, wherein the selecting, according to cell information stored in the one of the at least two SIMs, the cell for each of the at least two SIMs to reside in comprises:
    in response to that there is cell information stored in at least one SIM of the at least two SIMs, selecting the cell for each of the at least two SIMs to reside in according to the cell information stored in one of the at least one SIM.

14. The non-transitory computer-readable storage medium of claim 11, wherein the method further comprises:
    sending cell information of the selected cell to a remaining SIM of the at least two SIMs except the SIM used to select the cell.

15. The non-transitory computer-readable storage medium of claim 11, wherein the method further comprises:
    enabling each of the at least two SIMs to reside in the selected cell.

16. The non-transitory computer-readable storage medium of claim 11, wherein the at least two SIMs are connected to a same operator network.

* * * * *